Figure 1:
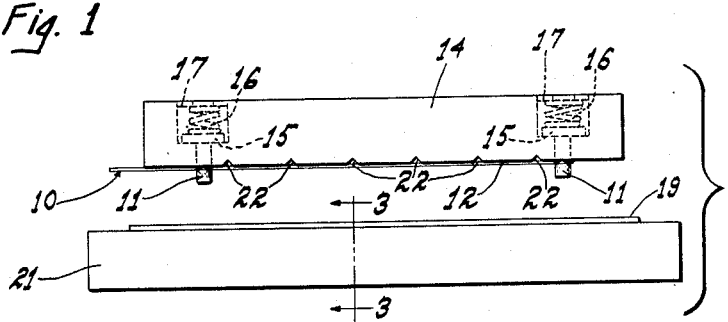

March 15, 1960  A. C. BOGGS  2,928,138
ELECTRIC HEATERS

Filed May 29, 1956  2 Sheets-Sheet 1

INVENTOR.
ALBEN C. BOGGS
BY
ATTORNEY

March 15, 1960 — A. C. BOGGS — 2,928,138
ELECTRIC HEATERS
Filed May 29, 1956 — 2 Sheets-Sheet 2
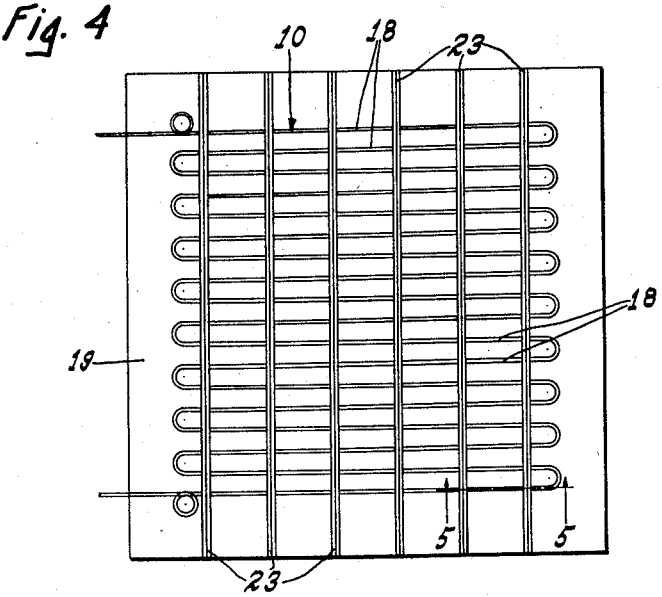
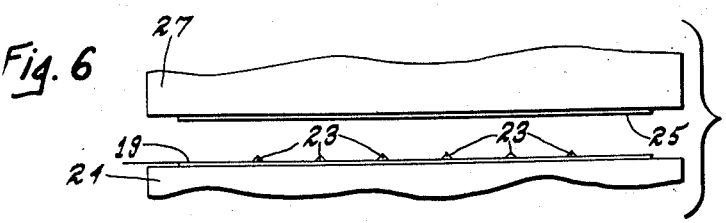
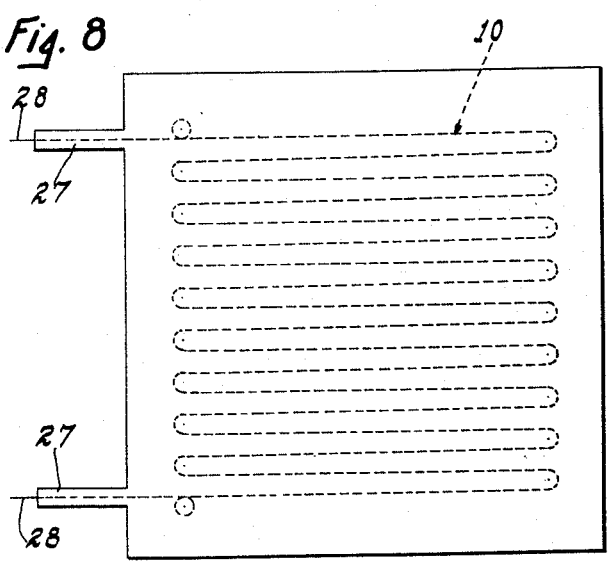
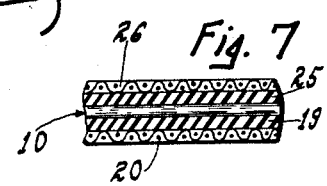
INVENTOR.
ALBEN C. BOGGS
BY
ATTORNEY

United States Patent Office 2,928,138
Patented Mar. 15, 1960

2,928,138

ELECTRIC HEATERS

Alben C. Boggs, Pittsburgh, Pa., assignor to Edwin L. Wiegand Company

Application May 29, 1956, Serial No. 588,085

2 Claims. (Cl. 18—59)

My invention relates to electric heaters, particularly to flexible heaters and the method of making the same, and the principal object of my invention is to provide new and improved heaters of this character.

The electric heater of my invention has particular use in applications which require flexibility of the heater. As examples of use, my improved heater may be wrapped around objects for the purpose of heating the same, or the contents thereof, or it may be inserted within a suitable covering and used as a heating pad, or the like.

Relatively rigid requirements of a flexible heater necessitate compartively expensive manufacturing operations and it is a further object of my invention to produce a heater meeting such requirements while at the same time reducing the cost of its manufacture.

Figure 2:
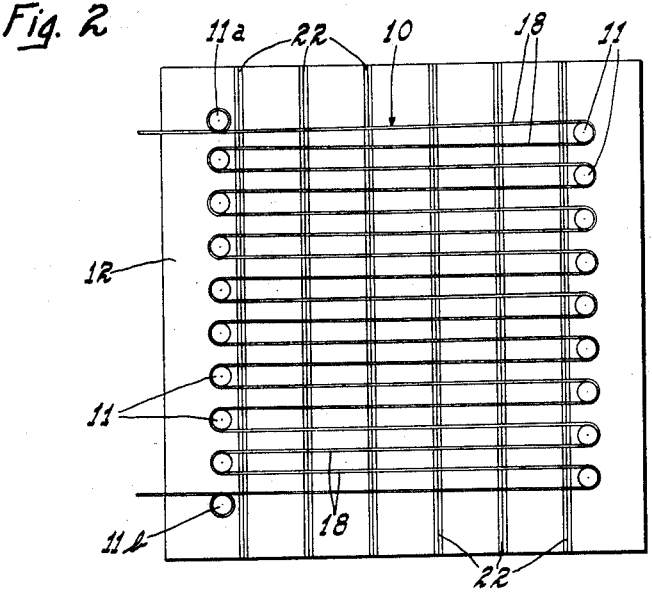
Figure 3:
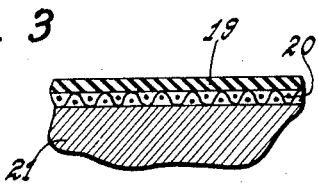

In the drawings accompanying this specification and forming a part of this application, there is shown, for purposes of illustration, an embodiment which my invention may assume, and in these drawings:

Figure 1 is a side elevation of a pair of platens and illustrates a step in the manufacture of my improved heating element, Figure 2 is a plan view of one of the platens shown in Figure 1, Figure 3 is an enlarged fragmentary sectional view corresponding generally to the line 3—3 of Figure 1, Figure 4 is a plan view of an article resulting from the method utilizing the structure shown in Figures 1 through 3, Figure 5 is an enlarged fragmentary sectional view corresponding generally to the line 5—5 of Figure 4, Figure 6 is a side elevation of another set of platens and illustrates a further step in the manufacture of my improved heating element, Figure 7 is an enlarged fragmentary sectional view through a completed heater, and Figure 8 is a plan view of a completed heater.

Generally, the method of my invention comprises the positioning of a resistor wire against a member formed of deformable material, and deforming at least portions of the member about the resistor wire to hold the latter to said member.

One form of the article so produced is shown in Figure 4 and, depending upon the material of the member, the article may be used, at least for certain purposes, in the condition formed by the method thus disclosed. It has been found preferable to form the member of uncured rubber-like material and, accordingly, in the article formed by the method thus disclosed, the resistor wire is held in position generally for further operations, such as a curing operation.

Referring more particularly to the specific embodiment of the invention herein disclosed, the resistor wire 10 is preferably wound in a series of loops about a plurality of pegs 11 which extend retractably from a surface 12 of a plate or platen 14.

The platen 14 may be made of any suitable rigid material, such as metal, and the pegs may be retractably projected from the surface 12 in any one of a number of ways. As shown in the drawings, each peg 11 has an inwardly disposed head 15 positioned in an enlargement of the opening through which the peg projects and bearing against the shoulder formed between the enlargement and the opening to limit projection of the peg. A coil spring 16 has one end bearing against a respective head and its other end seating against a shoulder 17 to confine the spring.

As best seen in Figure 2, the resistor wire is wound several times around a starting peg 11a to anchor this end of the wire, although it will be appreciated that anchorage may be effected in any other suitable manner. Thereafter, the resistor wire is wound around successive pegs on alternate sides of the plate 14 to provide a series of adjoining reaches 18, the wire then being wound several times around the ending peg 11b to anchor it.

As before mentioned, the deformable member is preferably formed of uncured rubber-like material which may take the form of a commercially available silicone polymer or compound. As best seen in Figures 1 and 3, the member is sheet-like and has an upper layer 19 of uncured rubber-like material and a lower layer 20 of a wear-resisting material, such as fiberglass cloth as presently used, which is suitably affixed to the layer 19.

The uncured rubber-like layer 19 has some form retaining properties although it is easily deformed under pressure and, therefore, the layer 20 of wear-resisting material is desirable to provide sufficient strength for handling and operational purposes.

The sheet formed by the layers 19 and 20 may be of any size, depending upon requirements. As herein disclosed, the sheet is rectangular in plan and of a size not materially larger than the size of the plate 14.

The sheet is preferably positioned on a plate or platen 21 (which may be the lower platen of a press) with the layer 19 of uncured rubber-like material uppermost. With the parts in position as shown in Figure 1, the plates are relatively moved to close the gap therebetween. Usually, the upper plate 14 is moved downwardly toward the lower plate 21.

The outward terminal ends of the pegs 11 first engage the upper surface of layer 19 and, as the plate 14 continues its downward movement, the pegs are pushed inwardly of the surface 12 and ultimately the wound resistor is stripped from the pegs.

The surface 12 of the plate 14 presses into the material of layer 19 and is provided with means which displace portions of the layer 19 to embrace or clasp at least portions of the resistor wire and maintain it in its predetermined pattern.

In the embodiment herein disclosed, the face 12 of the plate 14 is formed with spaced grooves 22, which may be V-shaped as shown, and which extend cross-wise with respect to the reaches 18 of the resistor wire. As the looped resistor wire is stripped from the pegs it is pressed against the upper surface of the layer 19 and is thus held in its predetermined pattern. Substantially simultaneously with the stripping of the resistor wire, the pressure of the plate 14 extrudes material from the layer 19 into the grooves 22 and about portions of the reaches 18.

Figure 5:
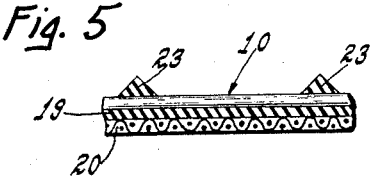

When the plate 14 is withdrawn from the plate 21, the resistor wire is held in its predetermined pattern by the ribs 23 which were extruded from the layer 19. As shown in Figures 4 and 5, the ribs 23 extend cross-wise of the reaches 18 of the wire and hold the wire in its predetermined pattern and in assembled relation with the layer 19.

As before mentioned, the assembly thus far produced may be used in some instances although it has been found that the uncured rubber-like material does not have sufficient strength whereby the ribs 23 will hold the wire for ordinary usage. The assembly thus far produced may be cured, to increase the strength of the uncured rubber-like material, and the heater then used for certain purposes.

However, for many practical uses, it is preferable to completely enclose the resistor wire in a coherent sheet. This may be accomplished in the manner shown in Figures 6 and 7. As herein shown, the article shown in Figures 4 and 5 is positioned on the upper face of a plate or platen member 24, with the layer of fiberglass cloth lowermost.

Another sheet, also preferably formed of a layer 25 of uncured rubber-like material (such as an uncured silicone polymer or compound) backed by a layer 26 of wear-resisting material (such as fiberglass cloth) is positioned to cover the article supported in the plate 24. The layers 19 and 20 of the two sheets are disposed in facing relation and an upper plate or platen 27 is brought down to apply pressure to the superimposed sheets. One or both of the plates 24—27 may be heated, the heat and pressure provided by the plates being sufficient to cure the layers 19 and 25 and form a homogeneous cover for the resistor wire.

The article thus formed is ready for use and may be connected in circuit with a source of electrical energy in any suitable manner. Since the resistor wire is entirely encased by the vulcanized sheets, it may be energized while immersed in water without any danger. The sheets for encasing the resistor wire may be formed with extending tabs 27 (see Figure 8) to also encase terminal sections 28 of the wire and provide electrical protection for such sections. Although the terminal sections are herein shown as extending from a common side of the article, it will be appreciated that the resistor wire may be wound on the pegs 11 so that the terminal sections extend from opposite sides of the article.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

1. The method of forming an electric heating element, comprising positioning an elongated resistor member on a face of a deformable body, pressing a recessed die surface against said body face to extrude therefrom into the die recesses portions of said body integral therewith and overlying longitudinally spaced portions of the resistor.

2. The method of forming an electric heating element, comprising positioning an elongated resistor member having a series of connected loops and reaches on the face of a deformable body, pressing a recessed die surface against said body face to extrude therefrom a plurality of outwardly projecting elongated ribs integral with said body and extending transversely of and overlying the resistor reaches.

References Cited in the file of this patent

UNITED STATES PATENTS

| | | |
|---|---|---|
| 1,728,273 | Hall | Sept. 17, 1929 |
| 2,064,971 | Edison | Dec. 22, 1936 |
| 2,622,272 | Haring et al. | Dec. 23, 1952 |
| 2,740,226 | Arff | Apr. 3, 1956 |